US010618530B2

(12) United States Patent
Carpenter et al.

(10) Patent No.: US 10,618,530 B2
(45) Date of Patent: Apr. 14, 2020

(54) SYSTEM FOR GROWING PLANTS (71) Applicant: Still Water Designs, Inc., Allen, MI (US)

(72) Inventors: Dwight D. Carpenter, Allen, MI (US); Andrew J. Herweyer, Grand Rapids, MI (US)

(73) Assignee: Still Water Designs, Inc., Allen, MI (US)

( * ) Notice: Subject to any disclaimer, the term of this patent is extended or adjusted under 35 U.S.C. 154(b) by 324 days.

(21) Appl. No.: 15/482,732

(22) Filed: Apr. 8, 2017

(65) Prior Publication Data

US 2017/0291616 A1 Oct. 12, 2017

Related U.S. Application Data

(60) Provisional application No. 62/319,934, filed on Apr. 8, 2016.

(51) Int. Cl.
*B61B 3/00* (2006.01)
*A01G 22/00* (2018.01)
(Continued)

(52) U.S. Cl.
CPC .............. *B61B 3/00* (2013.01); *A01G 17/005* (2013.01); *A01G 17/02* (2013.01); *A01G 22/00* (2018.02); *B61B 9/00* (2013.01)

(58) Field of Classification Search
CPC .... B61B 3/00; B61B 3/02; B61B 7/00; B61B 7/02; A01G 27/00; A01G 27/02; A01G 27/04; A01G 27/06
See application file for complete search history.

(56) References Cited

U.S. PATENT DOCUMENTS 9,516,820 B1 * 12/2016 Logsdon .............. A01G 27/003
2006/0162252 A1 7/2006 Lim
(Continued)

FOREIGN PATENT DOCUMENTS

JP S54104654 U 7/1979
JP 2001231373 A 8/2001
(Continued)

OTHER PUBLICATIONS

Images of system constructed by co-inventor Dwight D. Carpenter and used more than one year prior to Apr. 8, 2016 to grow tomatoes in a lean-and-lower growing method with the tomatoes sold commercially.
(Continued)

*Primary Examiner* — Robert J McCarry, Jr.
(74) *Attorney, Agent, or Firm* — Gardner, Linn, Burkhart & Ondersma LLP (57) ABSTRACT

A system for growing plants includes an elevated track circuit comprising two straight track sections and two arcuate track sections, with the straight track sections each including a cavity. A plurality of wheeled trolleys that each include a wheel configured to roll within the cavities and each include a shaft extending downwardly form the wheel. A drive system is configured to move the wheeled trolleys along the track circuit with the wheeled trolleys connected together by a cable, and with the shafts of the trolleys configured to support plants coupled thereto to selectively move the plants along the track circuit. Uses of the system include for growing produce of vine plants in a lean-and-lower manner, or transporting hanging plants through an irrigation device of the system.

23 Claims, 9 Drawing Sheets

(51) Int. Cl.
*A01G 17/00* (2006.01)
*A01G 17/02* (2006.01)
*B61B 9/00* (2006.01)

(56) References Cited

U.S. PATENT DOCUMENTS

2009/0293353 A1  12/2009  Arief et al.
2010/0229463 A1   9/2010  DeBruin

FOREIGN PATENT DOCUMENTS

| JP | 2001275496 A | 10/2001 |
| JP | 2007151434 A | 6/2007 |
| JP | 2007282558 A | 11/2007 |
| NL | 1021423 C1 | 1/2004 |

OTHER PUBLICATIONS

International Search Report and Written Opinion from corresponding Patent Cooperation Treaty (PCT) Application No. PCT/IB2017/052043, dated Jul. 10, 2017.
European Search Report from corresponding European Patent Application No. 17778780, dated Nov. 7, 2019.

* cited by examiner

SYSTEM FOR GROWING PLANTS

CROSS REFERENCE TO RELATED APPLICATION

The present application claims priority of U.S. provisional application Ser. No. 62/319,934 filed Apr. 8, 2016, which is hereby incorporated herein by reference in its entirety

FIELD OF THE INVENTION

The present invention is directed to a system and method for growing plants, and in particular to a system and method for growing produce in a large-scale vertical manner and supporting hanging baskets.

BACKGROUND OF THE INVENTION

Generally, growing vine-based produce producing plants using the lean-and-lower growing method involves growing one or more plant in soil or in planters that are spaced apart, with the vines or stems of the plants being vertically suspended, such as by twine. As the vines grow, a lower portion of the stems that are not producing produce are lowered to be generally horizontal and lie on a support surface, such as the floor of a greenhouse. The opposite produce producing portion of the vines remain suspended vertically. As the stem grows, the position of the vertical portion of the stem is moved along the row due to the continually increasing portion of the stem that is lowered onto the ground in a horizontal fashion.

A prior version of a lean-and-lower growing system utilized round tubes formed into a path with semicircular ends connected by straight tube sections. The system included multiple trolleys, each of which included an hourglass shaped wheel that traveled on a top portion of the tubular path, and included a downward extending rod, with the rods connected together by a wire to roll in unison. The system additionally included a single sprocket at each of the semicircular ends, one of which was powered by an electric drive motor. That system, however, suffered from performance deficiencies.

SUMMARY OF THE INVENTION

According to an aspect of the present invention a system for growing plants includes a track that forms a cavity and is supported by a structure above rows of plants. A trolley configured as a rolling hook is adapted to move within the cavity and a drive system is configured to move the rolling hook along the track. The plants are also coupled to the structure via the rolling hooks and the drive system is further configured to adjust the position of the rolling hook.

In a particular embodiment the system comprises an elevated track circuit configured to be supported by an overhead structure, with the track circuit comprising a track section including a cavity. The system includes multiple wheeled trolleys adapted to move within the cavity, and a drive system configured to move the wheeled trolleys along the track circuit, with the wheeled trolleys configured to support plants coupled thereto, such as on shafts of the trolleys, to selectively move the plants along the track circuit.

In accordance a particular embodiment, the cavities of the track sections include a rolling surface, with the wheeled trolleys each including a wheel configured to roll along the rolling surface. The cavity may be configured to have an inverted generally U-shaped cross sectional profile with two rolling surfaces separated by a gap, with the trolleys each including a pair of wheels, and with the shaft of the trolleys extending through the gap.

The system includes at least one idle end having arcuate track sections, where the arcuate track sections may include a groove within which the trolleys roll. The idle end may further include pulleys about which the cable connecting the trolleys passes. In a particular embodiment the system includes two idle ends and an irrigation device configured to supply water to plants supported on the trolleys.

In a particular embodiment the system includes a drive end that includes one of the arcuate track sections, with the drive end including a drive assembly comprising a motor for moving the trolleys along the track circuit. The drive assembly further includes a toothed drive sprocket adapted to be driven by the motor, with the sprocket engaging with the shafts of the trolleys to move the trolleys.

According to a further aspect of the present invention, a system for growing plants comprises an elevated track circuit configured to be supported by an overhead structure, with the track circuit comprising two straight track sections and two arcuate track sections. An idle end includes one of the arcuate track sections, and a drive end includes the other arcuate track section. The drive end includes a drive system that drives wheeled trolleys that are connected together by a cable along the track circuit. The trolleys include shafts that are configured to support plants, with the drive assembly further including a pair of toothed drive sprockets connected together for simultaneous rotation and adapted to be driven by a motor, with the toothed drive sprockets are configured to engage the shafts of the trolleys to move the trolleys.

The plant growing system of the present invention is uniquely configured to grow plants supported on the system, including vine type produce using the lean-and-lowering method to automatically and uniformly lean all of the plant vines simultaneously, thereby increasing efficiency and productivity. The system is further adapted for use with hanging plants to provide a robust method of transporting the plants, such as through an irrigation system, for uniform watering of the plants. These and other objects, advantages, purposes and features of this invention will become apparent upon review of the following specification in conjunction with the drawings.

DESCRIPTION OF THE PREFERRED EMBODIMENTS

Figure 1:
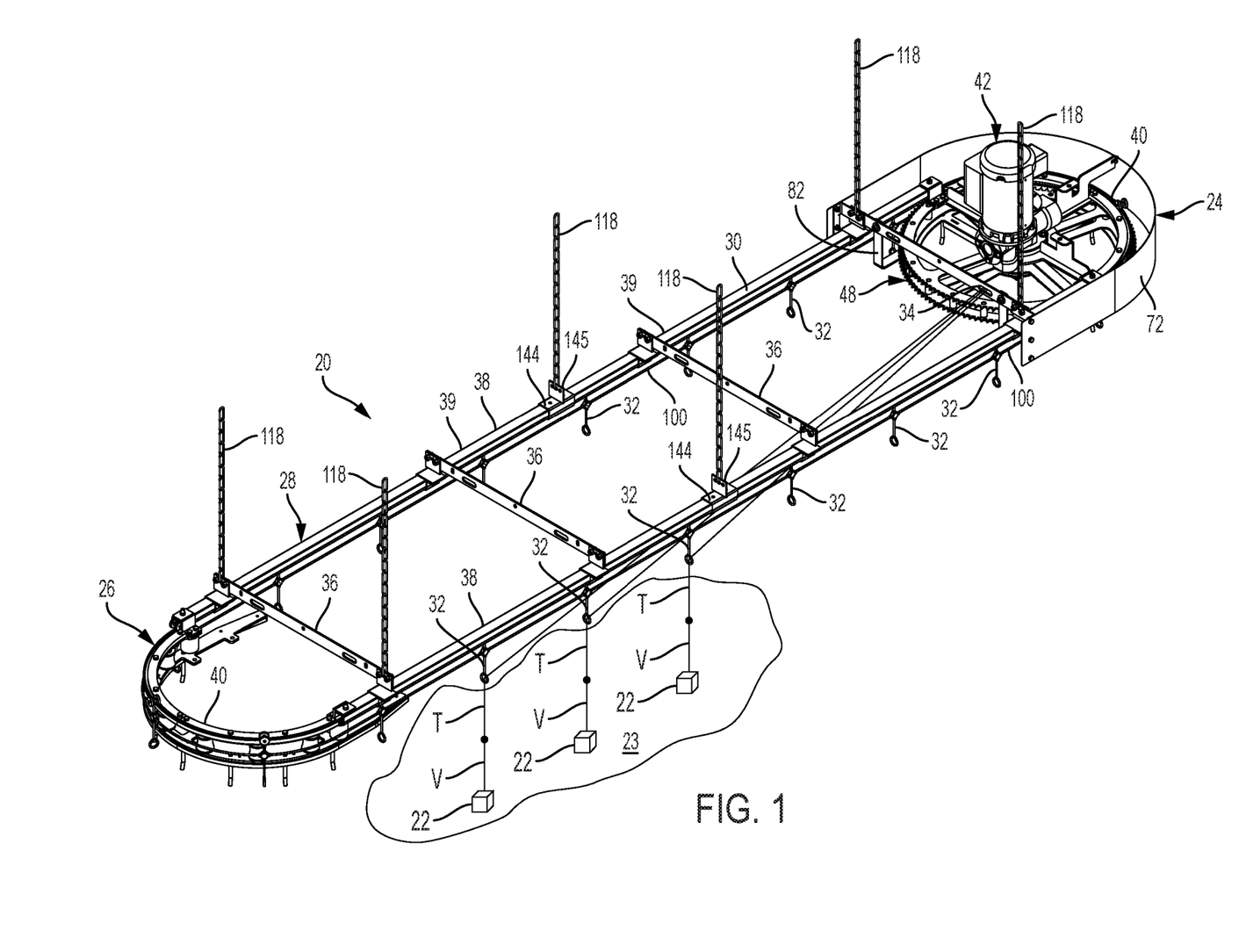
FIG. 1 is an overhead perspective view of a lean-and-lower growing system in accordance with an aspect of the present invention depicted growing produce.
Figure 2:
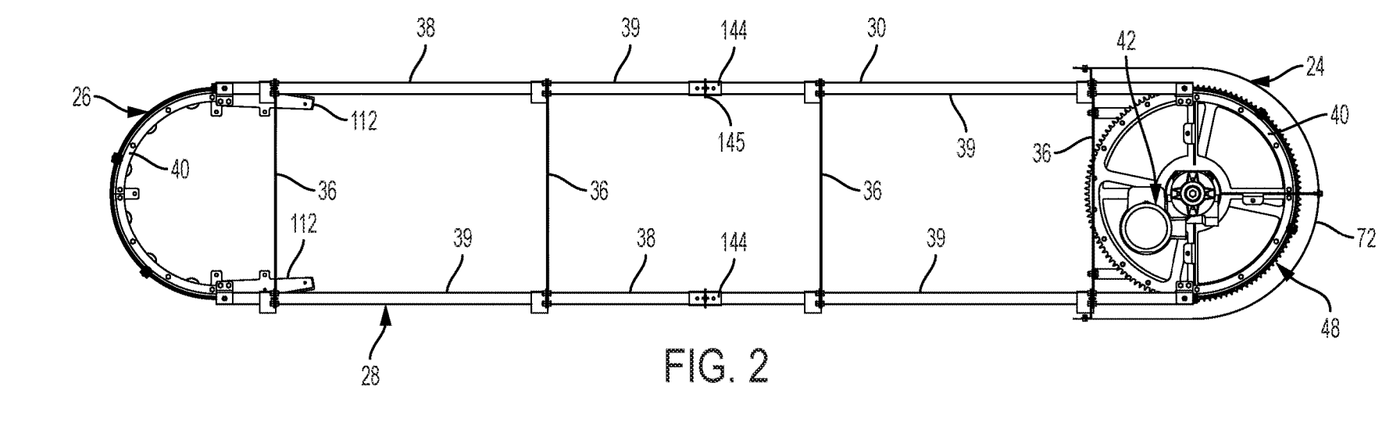
FIG. 2 is a top plan view of the system of FIG. 1.
Figure 3:
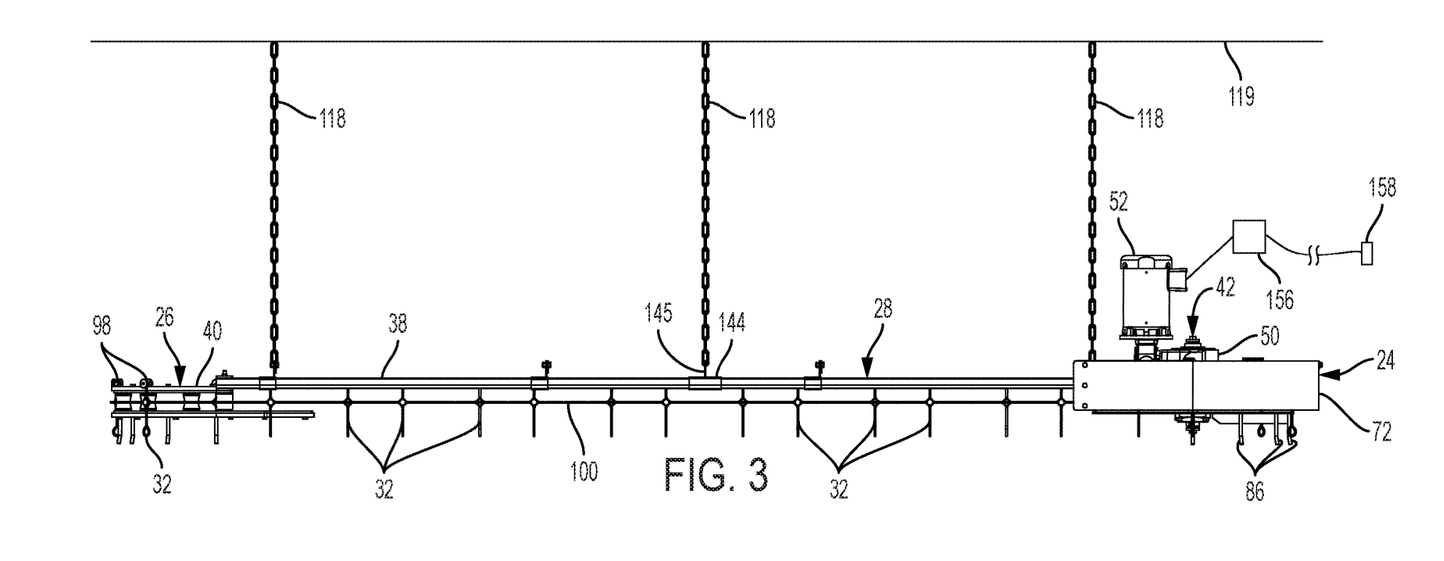
FIG. 3 is a side elevation view of the system of FIG. 1.

The present invention will now be described with reference to the accompanying figures, wherein the numbered elements in the following written description correspond to like-numbered elements in the figures. An automated plant growing conveyor system 20 is shown in FIGS. 1-3, where system 20 is configured as a lean-and-lower growing system that increases the efficiency and productivity of growing vine-like produce, such as tomatoes, hops, cucumbers, and the like, by way of a leaning-and-lowering method. In particular, system 20 performs the lean-and-lowering method for vine-like produce by automatically, simultaneously and uniformly leaning all of the plant vines V connected thereto.

With reference to FIG. 1, lean-and-lower growing system 20 is depicted with three produce producing plants having vines V and growing from containers 22 located on support surface 23, such as the ground, with vines V joined to system 20 via twine T, where the vines V may be clipped or otherwise fastened to twine T. System 20 includes a track assembly 28 and a drive end 24 and an idle end 26 whereby a track circuit 30 is defined.

Multiple trolleys that in the illustrated embodiment comprise roller hooks 32 are disposed for movement along the track circuit 30 with each strand of twine T that supports a vine V being disposed through and supported by a roller hook 32, with the opposite end of the twine T being connected to a tie-off point or structure 34, that in the illustrated embodiment comprises an aperture on a cross member constructed as a cross-track connector 36 to define a tie-off point. Roller hooks 32 are driven by a cable system for movement along or about track circuit 30 whereby each vine V supported by a roller hook 32 will be simultaneously moved in synchronous fashion whereby the lower portion of the vine V may be caused to be horizontally disposed on the surface supporting containers 22 while the produce producing portion of the vine V remains vertically supported. That is, as the plant vine V grows, the roller hook 32 will be driven toward the tie-off point of the twine T whereby a portion of the vine V will be laid down as the growing portion remains elevated. Although only three produce plants are depicted in FIG. 1, it should be appreciated that each roller 32 disposed about track circuit 30 may support a vine V of a separate plant such that system 20 may be used with numerous plants. It should further be appreciated that in practice the twine T for the plants may extend further than illustrated in FIG. 1, and even be wound about the drive end 24 and/or idle end 26, to thereby allow the plants to grow a significant amount. For example, in some embodiments for growing tomatoes the roller hooks 32 may be moved 35 to 40 feet.

As discussed in more detail below, the track assembly 28 includes straight track sections 38 coupled between the drive end 24 and idle end 26, with the drive end 24 and idle end 26 each including arcuate track sections 40, with the various track sections 38, 40 being aligned to form track circuit 30. In the illustrated embodiment, track sections 38 are spaced approximately twenty-four inches apart on each side to correspond with plant rows that are twenty-four inches apart, with each roller hook 32 being spaced sixteen inches apart to accommodate plants that are sixteen inches apart, such as within pots or the ground, within each row. It should be appreciated, however, that system 20 can be adapted for use with various plant arrangements, such as wider or narrower rows. Likewise, the length of a given growing system from drive end 24 to idle end 26 may also vary, where in particular examples the ends 24, 26 are 40 to 60 feet apparat, depending for example on the facility housing the growing system.

Referring to FIGS. 4-7, the drive end 24 comprises a drive assembly or system 42 that actuates the roller hooks 32 along the track circuit 30 to lean-and-lower the plants. Among other components, the drive end 24 includes a top plate or frame member 44 (FIG. 6) and a bottom plate or frame member 46 (FIG. 7), between which a drive sprocket or drive sprocket assembly 48 (FIG. 5) of the drive system 42 is disposed. Drive system 42 additionally includes a worm gear 50 to which is mounted an electric drive motor 52 used for rotating drive sprocket assembly 48.

Figure 6:
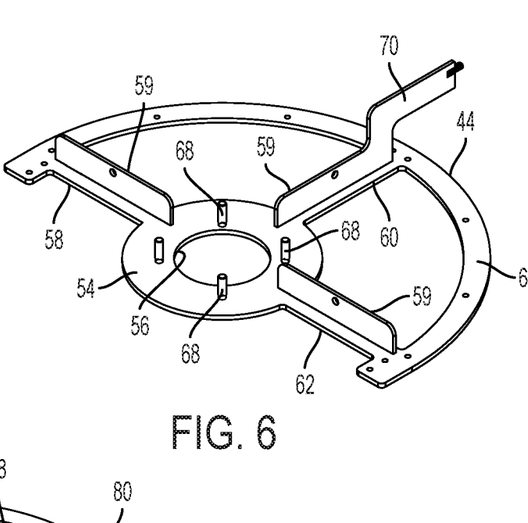
FIG. 6 is a perspective view of an upper frame member of the drive end of FIG. 4.

Top frame member 44 includes a central drive mount portion 54 having an aperture 56 there through and radial arms 58, 60, 62 extending to arcuate portion 64. A pair of brackets 66 (FIG. 4) are connected to arcuate portion 64 adjacent arms 58, 62 for mounting frame member 44 to track sections 38. Frame member 44 includes studs 68 to which worm gear 50 is mounted. Each arm 58, 60, 62 includes a stiffening rib 59, with the rib 59 located on arm 60 including an extending portion 70 used to mount guard 72 about drive end 24.

Bottom frame member 46 is circular and includes a central portion 74 having an aperture 76 with four radial arms 78 extending to a circular outer portion 80. A pair of L-shaped arms 82 extend from outer portion 80, with arms 82 configured to attach to a cross member 36 (FIG. 1) to secure frame member 46. A bearing block or support (not shown) is affixed to the underside of central portion 74 (relative to the orientation of FIG. 7) about aperture 76, with the bearing block receiving a shaft 84 (FIG. 5) extending through drive sprocket assembly 48, which further operates to secure bottom frame member 46.

Figure 7:
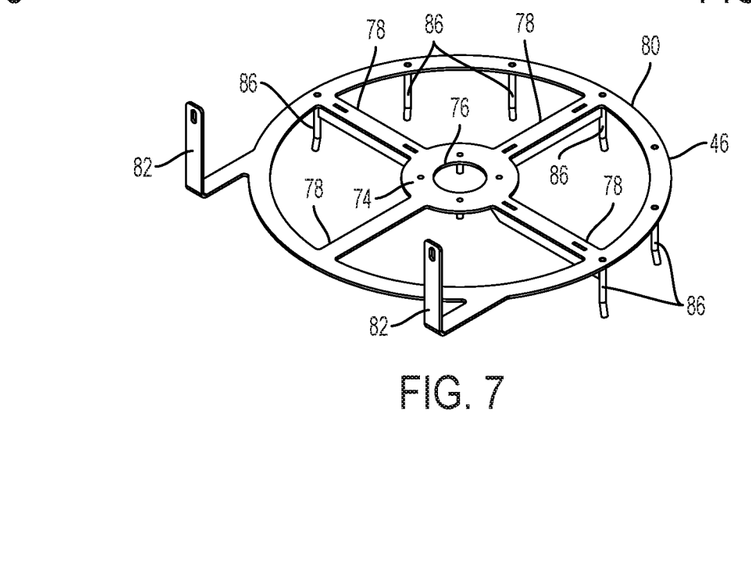
FIG. 7 is a perspective view of a lower frame member of the drive end of FIG. 4.
Figure 8:
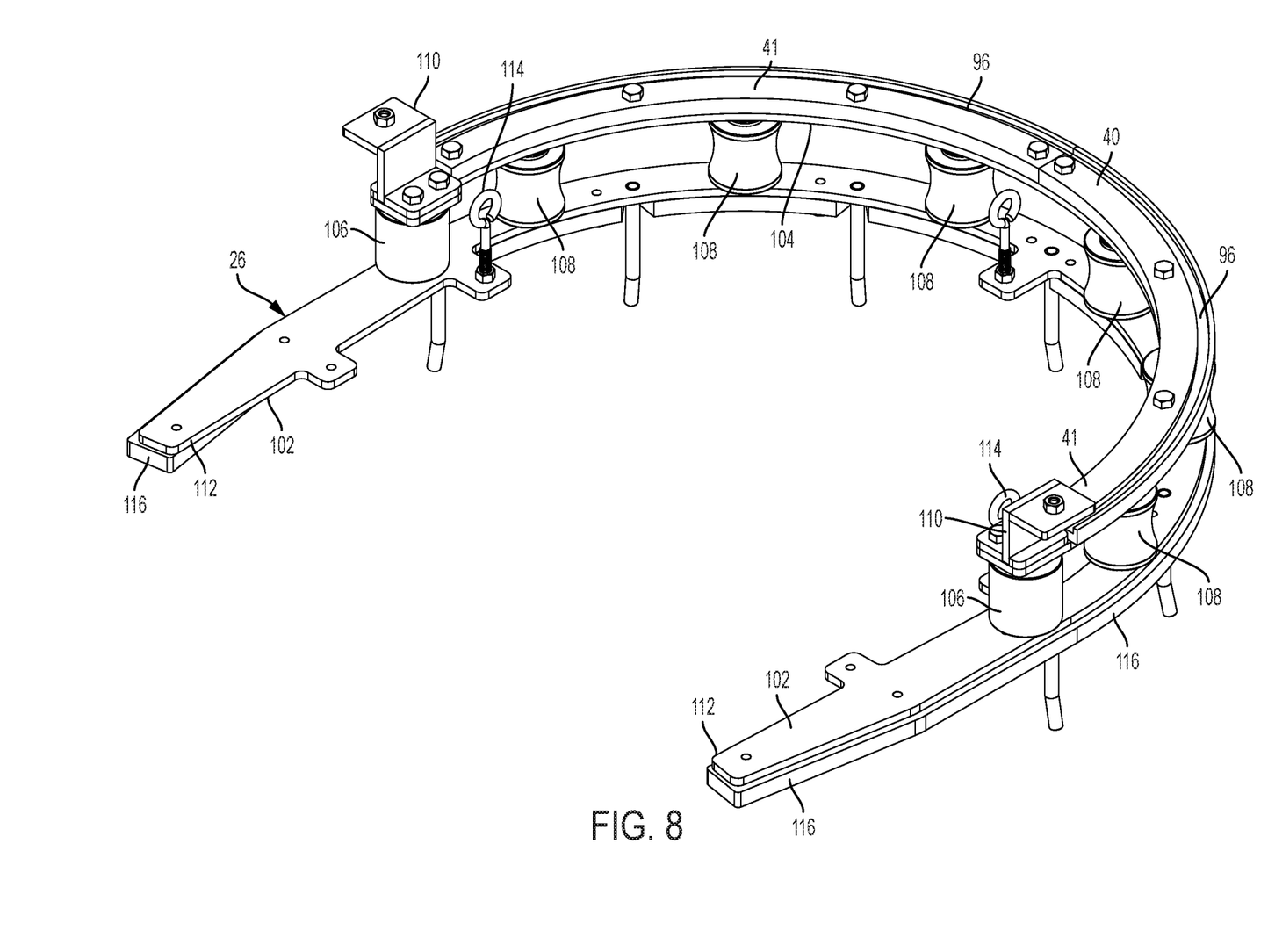
FIG. 8 is a is an overhead perspective view of an idle end of the system of FIG. 1.

Multiple string guides or supports 86 project downwardly from an outer periphery of bottom frame member 46, with the guides 86 constructed as fingers or pins. The guides 86 include a slight outwardly oriented angle, with the guides 86 functioning to support twine T that is wrapped around the arcuate drive end 24. As such, a tie-off point for a strand of twine T supported by a given roller hook 32 may be on an opposite side of a track section 38 from which the roller hook 32 is located. The roller hook 32 may then be conveyed or transported around the drive end 24 to lower the twine T, and accordingly, the vine V connected thereto. It should be understood that multiple strands of twine T may be wrapped around drive end 24, and thus engage with guides 86. Thus, multiple vines V may be laid down on the support surface in an arc corresponding to drive end 24.

Figure 5:
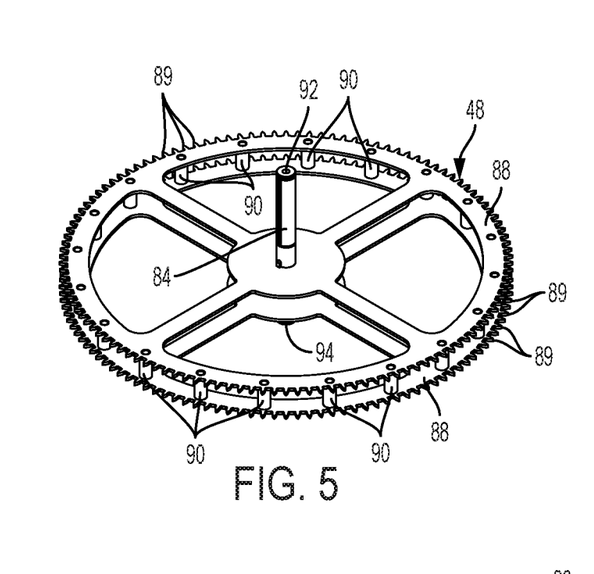
FIG. 5 is a perspective view of a drive wheel of the drive end of FIG. 4.

Drive sprocket assembly 48 includes a pair of individual drive sprockets 88 that are separated and connected together by spacers 90. Each sprocket 88 includes multiple teeth 89, with the teeth 89 of the connected sprockets 88 being aligned to receive the roller hooks 32, as discussed further below. As noted, shaft 84 is mounted to and extends through sprockets 88. A driven end 92 of shaft 84 is engaged with worm gear 50, and an opposite end 94 is connected to a bearing block, as discussed above. Motor 52 thus drives worm gear 50, which in turn drives shaft 84 to rotate drive sprocket assembly 48.

Referring again to FIG. 4, arcuate track section 40 of drive end 24 is mounted to arcuate portion 64 of top frame member 44, such as by fasteners, with arcuate track section 40 extending slightly beyond the outward radial edge of top frame member 44. Track section 40 of drive end 24 comprises a 180 degree semicircular arc, which in the illustrated embodiment comprises two separate 90 degree track section components 41. The arcuate track section 40 includes a groove 96 within which one of the wheels 98 of the roller hooks 32 rides as the roller hooks 32 are driven around drive end 24 by the drive system 42, with groove 96 being exposed and thus not formed within a cavity in the illustrated embodiment. As understood from FIG. 4, as the roller hooks 32 exit one of the straight track sections 38, the roller hooks 32 engage with the drive sprocket assembly 48 between aligned teeth of the two sprockets 88 to thereby drive the roller hooks 32 that are engaged with the drive sprocket assembly 48.

Figure 4:
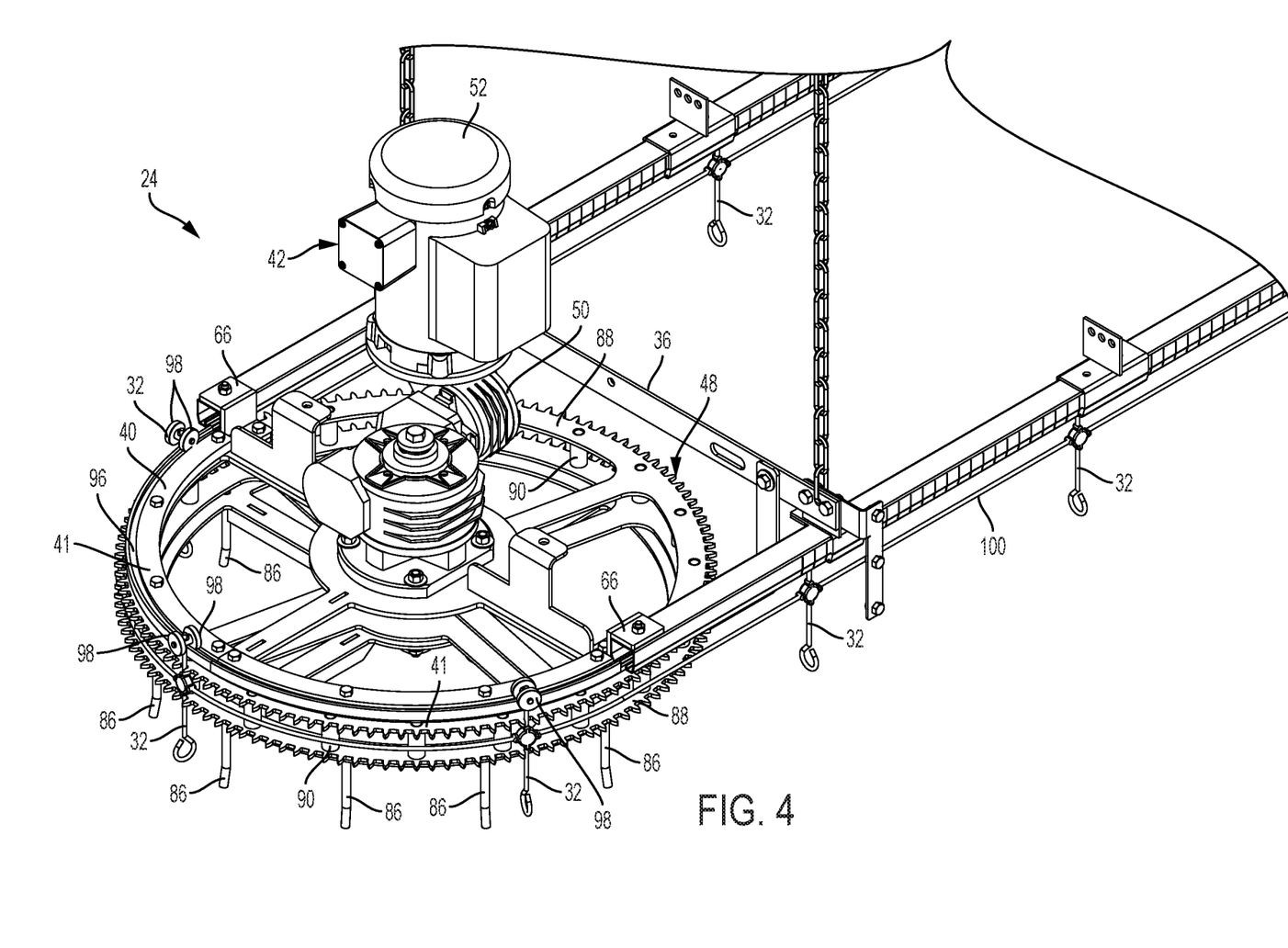
FIG. 4 is an overhead perspective view of a drive end of the system of FIG. 1 with a guard removed.

As understood from FIGS. 1, 3 and 4, a cable 100, which in the illustrated embodiment comprises a wire cable, interconnects the roller hooks 32 together in an endless manner whereby the drive system 42 is operable to cause the roller hooks 32 to simultaneously move about the track circuit 30, with the roller hooks 32 then being driven to travel into the opposite straight track section 38. Straight track sections 38 are thus vertically aligned in height with the arcuate track section 40 to allow the roller hooks 32 to travel there between. As also understood from FIG. 4, cable 100 contacts and rides along spacers 90 located between the two sprockets 88 as cable 100 travels over drive end 24, with the spacers 90 thus additionally operating as guides. It should be appreciated that the use of two spaced sprockets 88 functions to maintain the roller hooks 32 in a vertical orientation as the roller hooks 32 travel about drive end 24, whereas the connection with cable 100 may otherwise impart a force to inwardly orient the roller hooks 32. In the illustrated embodiment, the arcuate track section 40 is constructed of a polymeric or plastic material. Moreover, groove 96 is recessed in from the outer edge of the sections 41 such that the shaft of the roller hooks 32 is able to be guided there along, including due to arcuate track section 40 extending slightly radially outwardly from the outward radial peripheral edge of top frame member 44.

Referring now to FIGS. 1-3 and 8, idle end 26 is configured to align to the straight track sections 38 to form the circuit 30 such that the roller hooks 32 can be pulled between the straight track sections 38 and the arcuate track sections 40 of the drive end 24 and idle end 26. In the illustrated embodiment idle end 26 includes a bottom plate 102 and a top plate 104 that are connected together and separated by rotatable pulleys or guides 106, 108. The arcuate track section 40 of idle end 26 is mounted to top plate 104, with track section 40 being identical to the arcuate track section 40 of drive end 24. As with drive end 24, the arcuate track section 40 of idle end 26 extends slightly radially outwardly from the outward radial peripheral edge of top plate 104.

A pair of brackets 110 are included on top plate 104 for mounting idle end 26 to straight track sections 38 (FIG. 1). Bottom plate 102 has inwardly tapered ends 112 (see FIG. 2), with ends 112 aiding in guiding roller hooks 32 entering straight track sections 40 from either direction. Idle end 26 additionally includes a pair of suspension members configured as eye bolts 114 that may be used in suspending system 20, if desired.

Bottom plate 102 has a generally C-shaped construction and includes a guide plate or strip 116 mounted to an underside of plate 102. As understood from FIG. 8, guide strip 116 extends slightly outwardly beyond the outer radial edge of bottom plate 102. Guide plate 116 is constructed of a plastic material in like manner to the individual sections 41 of the arcuate track section 40. Roller hooks 32 are thus guided along the guide strip 116 and arcuate track section 40 when being moved along idle end 26. Bottom plate 102 further includes multiple string guides or supports 86 that project downwardly from an outer periphery of bottom plate 102, with the guides 86 constructed as fingers or pins as discussed above. String guides 86 enable twine T to be wrapped around the arcuate idle end 26, as discussed above in regard to drive end 24.

As noted, bottom plate 102 and top plate 104 are connected together and separated by rotatable pulleys or guides 106, 108. In the illustrated embodiment pulleys 106 are generally cylindrical and pulleys 108 are generally hourglass shaped, with pulleys 106 located proximate the initial entry point and final exit point for roller hooks 32 entering and exiting idle end 26, and pulleys 108 are disposed there between. As best understood from FIGS. 1 and 3, roller hooks 32 are interconnected by cable 100 with cable 100 positioned to be at an elevation between bottom plate 102 and top plate 104 whereby cable 100 rides over pulleys 106, 108 as cable 100 is moved about system 20.

As noted, the roller hooks 32 travel along the track circuit 30 by way of the drive system 42 driven by motor 52 and gear 50 of drive end 24. Each of the roller hooks 32 are coupled to the cable 100 at substantially uniform intervals (such as sixteen inches in the illustrated embodiment) along the track circuit 30. Thus, operating the motor 52 moves the roller hooks 32 by way of the engagement of a portion of the roller hooks 32 with the drive sprocket assembly 48, which in turn moves the remaining roller hooks 32 along the track circuit 30 via their interconnection with cable 100. As also noted, moving roller hooks 32 along track circuit 30 via the cable system leans-and-lowers the plants to increase the efficiency and productivity of growing vine-based produce.

Figure 12:
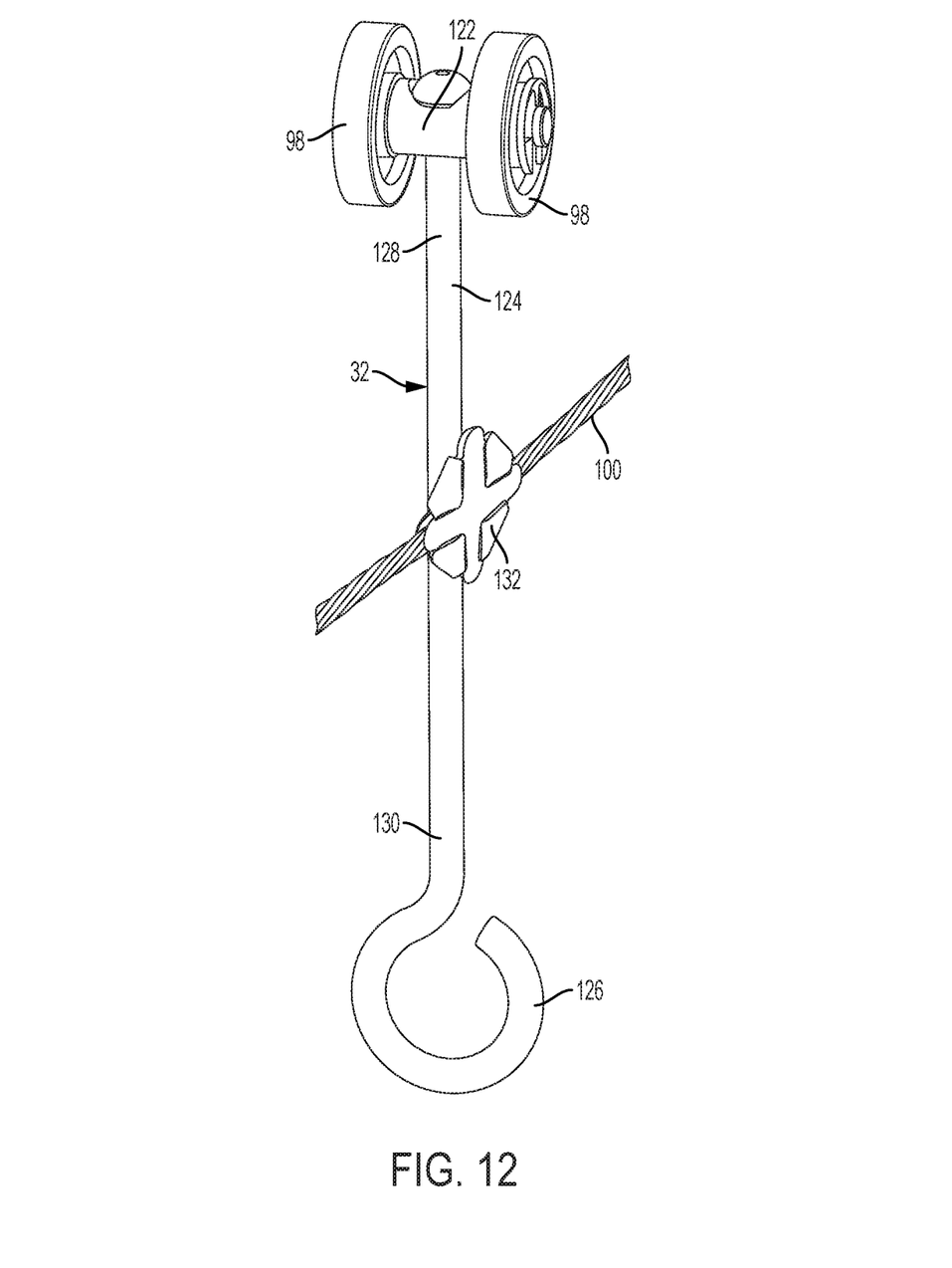
FIG. 12 is a perspective view of a roller hook of the system of FIG. 1.

Referring to FIG. 12, each of the trolleys or roller hooks 32 includes a roller, such as a pair of wheels 98, a rolling shaft 122, a rod or vertical member or shaft 124, and hook 126. The vertical member 124 has a wheel end 128, which is coupled to the rolling shaft 122, and a hook end 130, which is coupled to the hook 126. In the illustrated embodiment, the wheels 98 are coupled to the rolling shaft 122 with the vertical member 124 disposed there between. A cable fastener 132 on vertical member 124 couples the cable 100 to the vertical member 124 of each roller hook 32. In the illustrated embodiment the cable fasteners 132 comprise wire net ties, such as may be provided by Loos and Company of Pomfret, Conn., U.S.A. As noted, the cable fasteners 132 are located along shaft 124 whereby they are able to pass adjacent to the pulleys 106, 108 of the idle end 26 and past the spacers 90 of the drive end 24. In the illustrated embodiment, each cable fastener 132 is thus approximately near a midway point of the vertical member 124.

The hook 126 is disposed at the hook end 130 of the vertical member 124, and is configured for the twine strand T to engage through the hook 126 and be supported by the hook 126 between the vine V and one of the tie-off points, such as on a cross member 36. Thus, the cable fasteners 132 couple the roller hooks 32 to the cable 100 to simultaneously move the roller hooks 32 along the circuit 30, and the roller hooks 32 move the plant vines V along the circuit 30 via the twine strands T that are engaged through the hooks 126. It should be appreciated that due to an end of twine T being connected to a tie-off point, that movement of roller hooks 32 will cause the opposite end of twine T affixed to vine V to lower the vine V, thereby accommodating the growth of the vine V.

Figure 10:
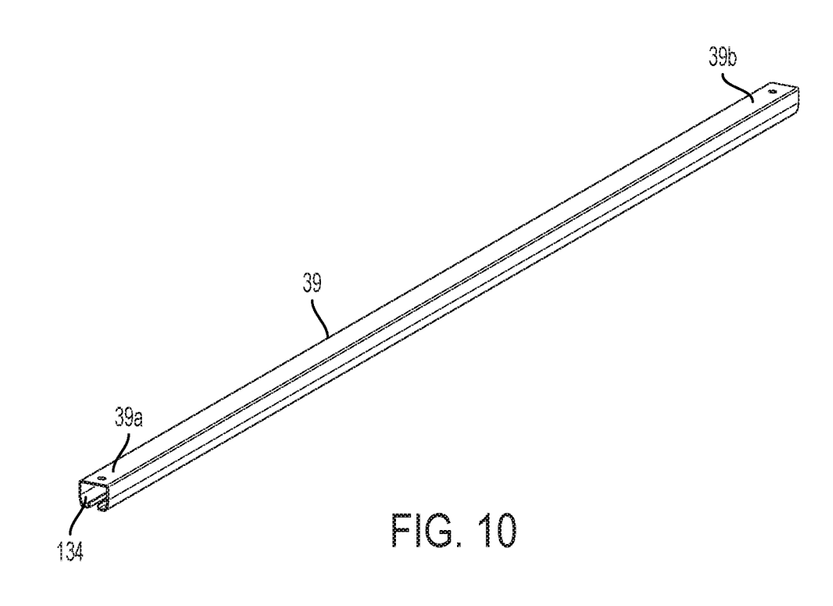
FIG. 10 is a perspective view of a track section of the system of FIG. 1.
Figure 11:
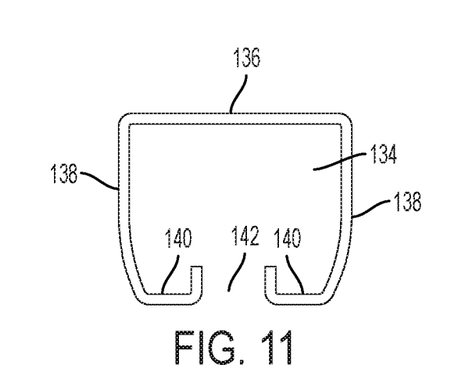
FIG. 11 is an end view of the track section of FIG. 10.

As understood from FIGS. 1-3, the straight track sections 38 are configured to support and guide the roller hooks 32 along parallel portions of the circuit 30, where in the illustrated embodiment the straight track sections 38 are formed from track members 39 that are joined together. Referring now to FIGS. 10 and 11, a track member 39 is shown to form a cavity 134 within which the roller hooks 32 are contained and moved along the straight track sections 38, as described above. Each cavity 134 has a generally inverted U-like cross-section, formed of a horizontal portion 136, vertical portions 138 on either side of the horizontal portion 136 and that are generally perpendicular to the horizontal portion 136, and a pair of inwardly oriented rolling surfaces 140 formed at the end of the vertical portions 138. Each of the rolling surfaces 140 extend horizontally toward the opposing vertical portion 138 for a distance that is substantially the width of each roller hook wheel 98, such that there is a hook gap 142 between the rolling surfaces 140, wherein each of the rolling surfaces 140 supports each of the hook wheels 122, with vertical member 124 extending downward through gap 142.

The track members 39 of the illustrated embodiment are made of metal, such as steel, for ease of manufacturing and strength to support the weight of the roller hooks 32 and plant vines V. In particular, the track members 39 are supplied by Duratrak, Inc. of Elk Grove Village, Ill., U.S.A. However, other manufacturers, materials, and track configurations may be employed, such as composites, plastics, or the like. The track members 39 are configured to allow the roller hooks 32 to freely roll along the circuit 30, as pulled by the cable 100 and drive system 42, and remain securely on the track circuit 30. In an alternative embodiment, the arcuate track sections 40 of each end 24, 26 could be configured to have the same cross-sectional profile as track members 39.

As noted, straight track sections 38 are generally formed in pieces 39 that are joined or spliced together to form the straight track sections 38 of the circuit 30. In the illustrated embodiment, for example, the individual track members or pieces are approximately ten feet long, with the two straight track sections 38 being spaced apart from each other by approximately twenty-four inches. As best understood from FIGS. 1-3, a track sleeve or splice member 144 is shown on each of the two straight track sections 38, with splice member 144 configured to support a first end 39a of one track member 39 and a second end 39b of another track member 39 within an internal cavity of splice member 144. Splice members 144 have a generally similar, but slightly larger, cross sectional profile to track members 39 whereby the respective ends of adjacent track members may be received and secured therein. Accordingly, splice members 144 include a central gap that aligns with the gap 142 of track sections 38 to allow vertical shaft 124 of roller hooks 32 to pass there through. Splice members 144 further include upright flanges 145 for securing to support hangers, which in the illustrated embodiment comprise chains 118 to support the system 20 above the ground.

Figure 9:
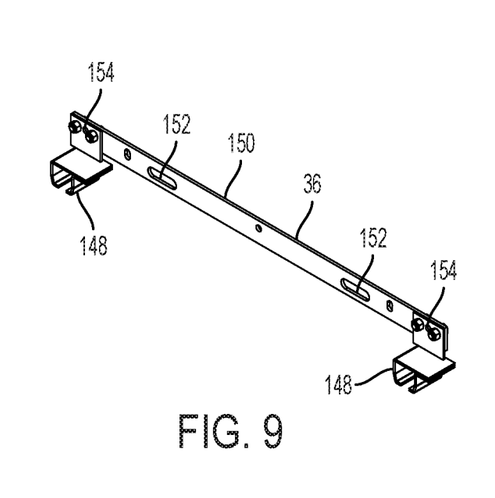
FIG. 9 is a perspective view of a cross-track connector of the system of FIG. 1.

A cross member 36 is illustrated in FIG. 9, where multiple cross members 36 are used with system 20 to provide bracing support to the track assembly 28 and, as understood from FIG. 1, may also be used to suspend system 20 from a support structure 119 (FIG. 3), such as a ceiling or roof structure, via support hangers 118, which in the illustrated embodiment comprise chains, but may alternatively comprise wire ropes, or other support hangers. Cross member 36 include track sleeves 148 on either end, with the sleeves 148 being joined together and separated by a cross bar 150. Straight track sections 38, and in particular track members 39, are supported within sleeves 150, with sleeves 150 having a generally similar cross sectional profile to the splice members 144 discussed above, including a gap to allow the vertical shaft 124 of roller hooks 32 to pass there through. Cross bar 150 additionally includes apertures 152 to which strands of twine T may be tied off, whereby apertures 152 define tie-off points. Mounting holes 154 are additionally provided on cross member 36 adjacent sleeves 148, wherein chains 118 may be joined thereto, such as by fasteners.

In the illustrated embodiment, the sleeves 144 and 148 are manufactured by Duratrack, Inc. Optionally, each cross-track connector 34 may include eye-bolts that are fastened to the cross bar 150 and coupled to hanging equipment that is generally further coupled to a ceiling or structure above the system 20 to support a portion of the weight of the system 20. As noted, the cross members 36 of the illustrated embodiment also include apertures 152 comprising tie-off points that allow the operators to fix upper ends of a group of plant twine strands T that extend through a corresponding group of roller hooks 32.

With further reference to FIG. 3, a control system is provided that includes a controller 156 that allows for the customized operation of the system 20. Controller 156 may comprise a microprocessor, computer or the like, incorporating hardware and/or software for controlling the operation of system 20. Controller 156 allows for forward and reverse controls regarding motion of the trolleys 32, i.e. clockwise or counterclockwise motion relative to the orientation of FIG. 2, including based on distance of movement. Controller 156 additionally enables operation to be set based on a timer, such as when to operate and/or for how long to operate. Control system further includes a handheld controller 158 that may be used for operating system 20. Handheld controller 158 may be connected to Controller 156 by an electronic cord or cable, for example. Controller 158 may be provided with various buttons that are operative to send signals to control 156. For example, controller 158 may have a single button to activate control 156 and/or control forward or reverse movement of trolleys 32. Controller 158 may alternatively be provided with multiple buttons for controlling additional features and/or programming the control system. Still further, handheld controller 158 may be provided with a lockable attachment for securing the controller 158 in place when not in use. Controller 158 may thus be operated to selectively advance trolleys 32 based upon the growth of vines V of the plants to thereby lower the non-producing portion of the vines V onto the ground while continually maintaining the producing portion of the vines V elevated. It should be understood that as the vine V grows it will be necessary to occasionally fasten the new growth vine V to the twine T.

Figure 15:
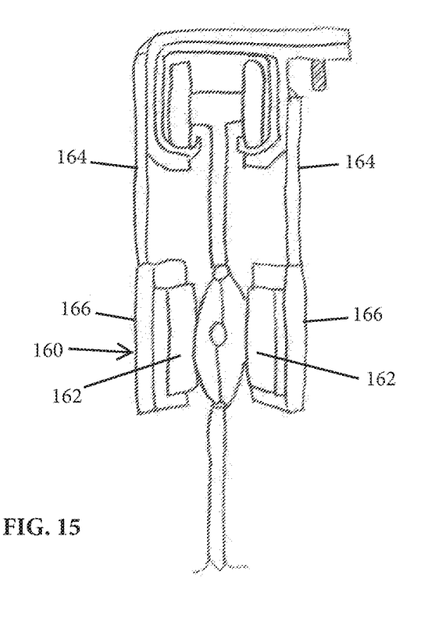
FIG. 15 is a front view of an optional brake system that may be used with the systems of FIGS. 1 and 13.
Figure 16:
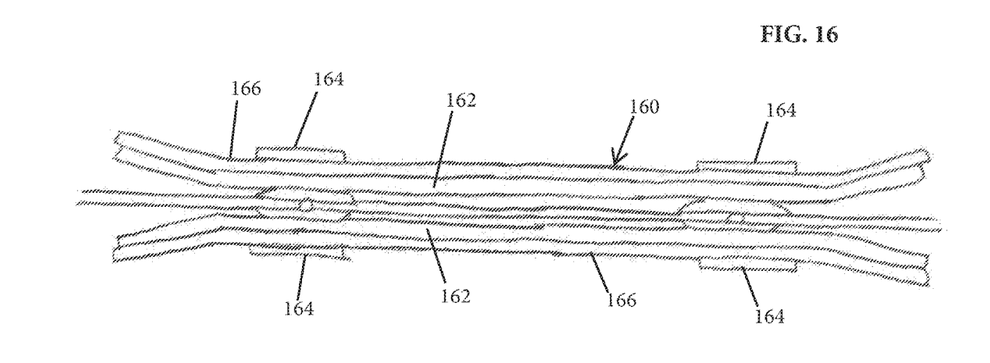
FIG. 16 is a partial bottom view of the brake system of FIG. 15.

Referring now to FIGS. 15 and 16, a brake system 160 is illustrated that may be used with system 20, or system 220 discussed below. Brake system 160 in the illustrated embodiment is configured as a friction brake system that engages with trolleys 32 to prevent unintended motion of the trolleys 32 and cable 100 that may, for example, occur due to the lean-and-lower process whereby the lengths of vines V being supported in a leaning orientation tend to pull on trolleys 32 in an angled, non-vertically oriented downward force and thereby impart motion to trolleys 32. Brake system 160 is mounted to straight track section 38 and includes brake pads 162 that are rubberized and located vertically at approximately the height of cable fasteners 132 whereby cable fasteners 132 are engaged with the brake pads 162 when being drawing through brake system 160. Brake system further includes mounting arms 164 for connecting with straight track section 38, and includes backing plates 166 that are connected to the opposite end of arms 164, with brake pads 162 connected to backing plates 166. As shown, the backing plates 166 and brake pads 162 have outwardly angled ends to facilitate entry of the trolleys 32 into the brake system 160 from either direction. It should be appreciated that one or more brake systems 160 may be disposed about track circuit 30, and/or such systems could be alternatively configured to engage with cable 100.

Figure 13:
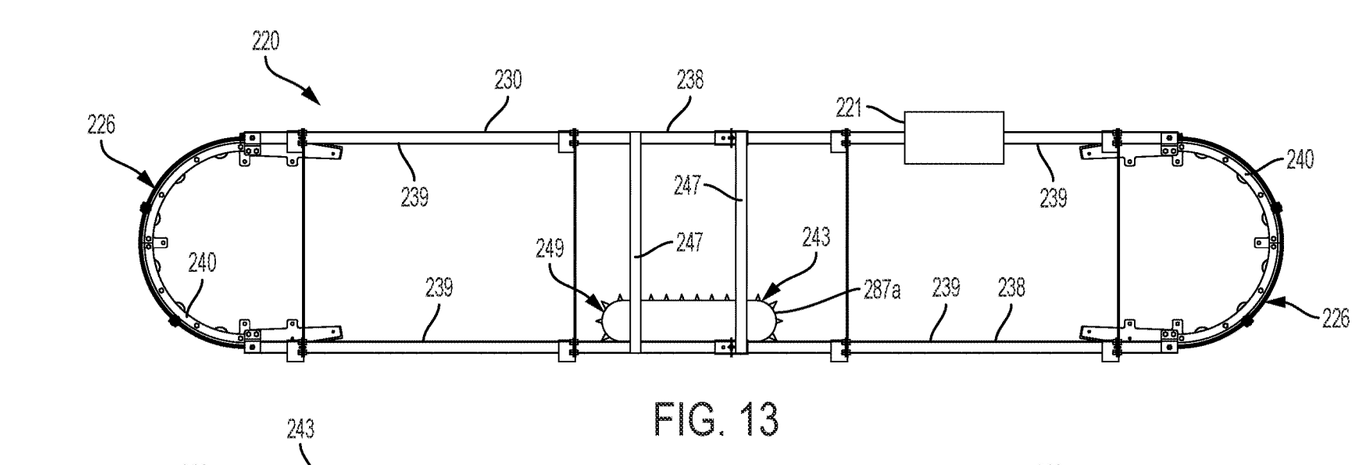
FIG. 13 is an top plan view of hanging basket growing system in accordance with another aspect of the present invention.
Figure 14:
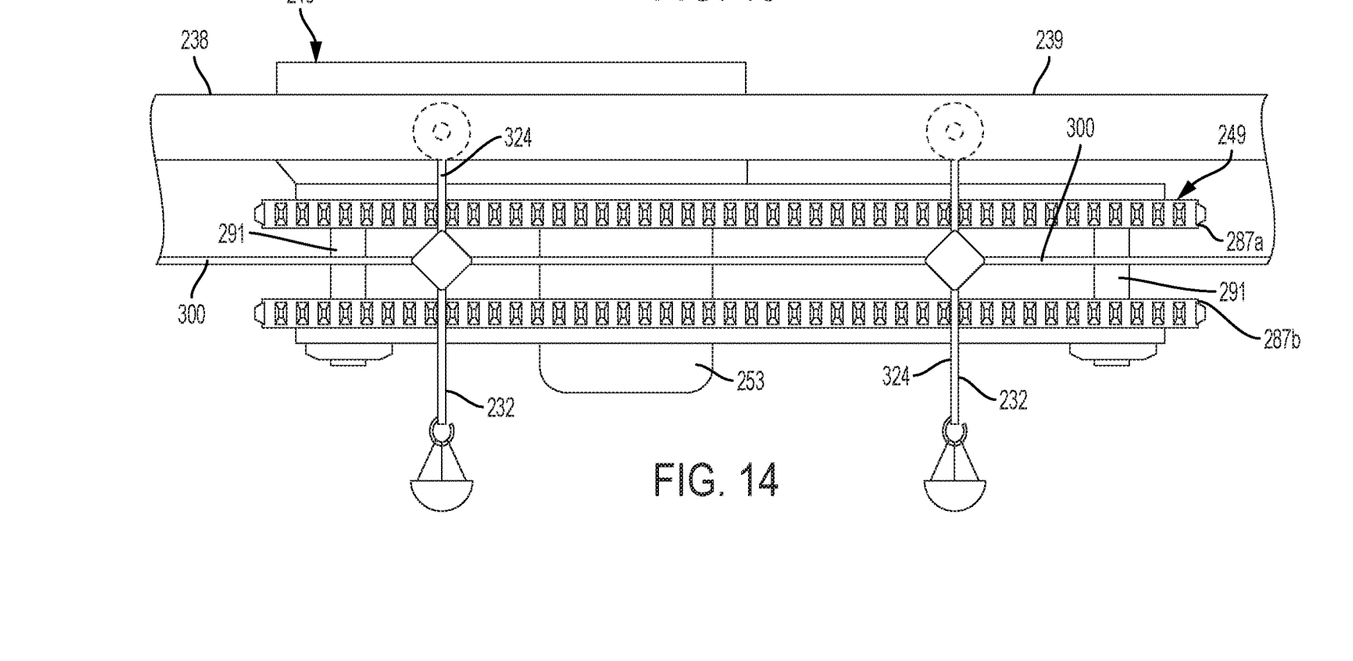
FIG. 14 is a side elevation view of the drive system of the growing system of FIG. 13.

Referring now to FIGS. 13 and 14, an embodiment of an alternative plant growing system 220 in accordance with the present invention is shown. System 220 shares substantial similarity with system 20 discussed above, with the number 200 added to the reference numbers of corresponding features and components of system 20. Due to the similarities of systems 20 and 220 not all of the like features and components of system 220 are discussed herein.

System 220 is configured for use in the growing of potted plants that are directly hung from roller hooks 232, and in particular is used as an automated watering plant growing system. To this end an automated irrigation system 221 is mounted to the track circuit 230, and in the illustrated embodiment is shown mounted to one of the straight track sections 238. Automated irrigation system 221 may be constructed in generally similar manner as the system disclosed in U.S. Pat. No. 9,516,820, which is incorporated herein by reference, with system 221 adapted for use with the particular configuration of track members 239 of system 220.

In addition to straight track sections 238, track circuit 230 of system 220 includes two idle ends 226, with each idle end 226 including an arcuate track section 240. System 220 thus differs from system 20 in that system 220 does not include a drive end 24 of system 20. System 220 does, however, include an alternative drive assembly 243 mounted to the straight track sections 238 by cross bars 247.

Drive assembly 243 includes a drive motor 253 that drives a toothed drive comprising a toothed drive chain assembly 249, which itself compries a pair of toothed drive chains 287a, 287b that are connected to rotate simultaneously together by shafts 291. As understood from FIG. 14, vertical shafts 324 of roller hooks 232 are simultaneously engaged by drive chain assembly 249 with cable 300 passing at a vertical elevation between the drive chains 287a, 287b. Drive assembly 243 thus operates to drive the roller hooks 232 about the track circuit 230, including about the two idle ends 226.

Water is supplied to irrigation system 221, with irrigation system 221 in turn operating to discharge water onto hanging plant baskets that are disposed on roller hooks 232 as the roller hooks 232 are advanced and pass beneath the irrigation system 221. A control system, such as control 156 discussed above, may be used to control the movement of roller hooks 232 to position the hanging plants under irrigation system 221, with the control system further adapted to control the operation of irrigation system 221 to dispense water onto the hanging plants positioned thereunder.

The present invention provides a system and method for growing plants, including vine-like produce using a lean-and-lower method and/or hanging baskets, with increased efficiency and productivity. The system and method are versatile to be used in a lean-and-lower operation with tomatoes, hops, cucumbers, and the like, and reduces cost and time of maintaining the produce, compared to manual methods. Alternatively, the system is well adapted for use with supporting hanging baskets for watering and growing the plants. The system includes an overhead track circuit defining a track assembly that includes arcuate track sections and straight track sections, with the system including either a pair of arcuate idle ends or an arcuate idle end and an arcuate drive end. A drive system is further provided to move a plurality of trolleys configured as roller hooks disposed on the track assembly, where the trolleys support plants, such as vines via twine during a growing season for efficient adjustment or hanging plant baskets.

Although plants having vines V are shown within containers 22, it should be appreciated that alternatively the plants could be growing within the ground without containers. Moreover, it should readily be appreciated that although discussed in connection with the use of twine T that other flexible strands may be used, including string, rope or the like. Still further, alternative track configurations and shapes may be employed, including arcuate end tracks that include cavities. Further changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:
1. A system for growing plants, said system comprising:
an elevated track circuit configured to be supported by an overhead structure, said track circuit comprising a track section including a cavity;
a plurality of trolleys configured to move within said cavity; and
a drive system configured to move said trolleys along said track circuit;
wherein said trolleys are configured to support plants coupled thereto with said trolleys selectively moving the plants along said track circuit; and
wherein said cavity comprises a rolling surface disposed within said cavity and wherein said trolleys each include a wheel configured to roll along said rolling surface, said trolleys further including a shaft extending downwardly from said wheel, with said shaft configured to support a plant.
2. The system of claim 1, wherein said cavity has an inverted generally U-shaped cross sectional profile and includes an additional rolling surface whereby said cavity includes a pair of rolling surfaces with said pair of rolling surfaces separated by a gap, and wherein said trolleys each include an additional wheel whereby said trolley comprises a pair of wheels, with each said wheel of said trolley configured to roll along a respective one of said pair of rolling surfaces, and wherein said shaft of said trolleys extends through said gap.
3. The system of claim 1, wherein said track circuit comprises two straight track sections and two arcuate track sections, and wherein each said straight track section includes a said cavity.

4. The system of claim 3, wherein said straight track sections are disposed between the two said arcuate track sections.

5. The system of claim 4, wherein said straight track sections extend generally parallel with respect to each other, and wherein said arcuate track sections are semicircular.

6. The system of claim 3, wherein said system comprises an idle end with said idle end including one of said arcuate track sections with said arcuate track section of said idle end including a groove, and wherein said trolleys each include a wheel adapted to roll within said groove and a shaft extending downwardly from said wheel, said shaft configured to support a plant, and wherein said groove is aligned with said cavities of said straight track sections to enable said trolleys to transition between said straight track sections and said idle end.

7. The system of claim 6, wherein said idle end further includes an arcuate guide strip disposed vertically below said arcuate track section, and wherein said shafts of said trolleys contacts said guide strip as said trolleys travel about said idle end.

8. The system of claim 7, wherein said arcuate track section and said arcuate guide strip are separated by pulleys disposed there between, and wherein said trolleys are connected together via a cable with said cable contacting said pulleys as said trolleys travel about said idle end.

9. The system of claim 6, wherein said system comprises an additional said idle end that includes the other of said arcuate track sections, and wherein said trolleys are connected together via a cable and said system further includes a drive assembly disposed at one of said straight track sections, said drive assembly including a toothed drive configured to engage said shafts of said trolleys to move said trolleys.

10. The system of claim 9, further including an irrigation device mounted to said track circuit, said irrigation device configured to supply water to plants supported on said shafts of said trolleys.

11. The system of claim 3, wherein said system includes a drive end said drive end including one of said arcuate track sections, said drive end including a drive assembly comprising a motor for moving said trolleys along said track circuit.

12. The system of claim 11, wherein said arcuate track section of said drive end includes a groove, and wherein said trolleys each include a wheel adapted to roll within said groove and a shaft extending downwardly from said wheel, said shaft configured to support a plant, and wherein said groove is aligned with said cavities of said straight track sections to enable said trolleys to transition between said straight track sections and said drive end.

13. The system of claim 11, wherein said drive assembly includes a toothed drive sprocket adapted to be driven by said motor, and wherein said trolleys each include a shaft extending downwardly from a wheel, and wherein said toothed drive sprocket is configured to engage said shafts of said trolleys to move said trolleys.

14. The system of claim 13, wherein said drive assembly further includes another toothed drive sprocket adapted to be driven by said motor and configured to engage said shafts of said trolleys to move said trolleys, said toothed drive sprockets being connected together for simultaneous rotation.

15. The system of claim 14, wherein said trolleys are connected together by a cable.

16. A system for growing plants, said system comprising:
an elevated track circuit configured to be supported by an overhead structure, said track circuit comprising two straight track sections and two arcuate track sections, and wherein said straight track sections each include a cavity with a rolling surface disposed within said cavity;
a plurality of trolleys configured to move within said cavity, wherein said trolleys each include a wheel configured to roll along said rolling surface and include a shaft extending downwardly form said wheel; and
a drive system configured to move said trolleys along said track circuit with said trolleys connected together by a cable;
wherein said shafts of said trolleys are configured to support plants coupled thereto with said trolleys selectively moving the plants along said track circuit.

17. The system of claim 16, wherein said cavities have an inverted generally U-shaped cross sectional profile and include an additional rolling surface whereby said cavities include a pair of rolling surfaces with said pair of rolling surfaces separated by a gap, and wherein said trolleys each include an additional wheel whereby said trolley comprises a pair of wheels, with each said wheel of said trolley configured to roll along a respective one of said pair of rolling surfaces, and wherein said shaft of said trolleys extends through said gap.

18. The system of claim 16, wherein said system comprises an idle end with said idle end including one of said arcuate track sections.

19. The system of claim 18, wherein said system includes a drive end with said drive end including one of said arcuate track sections, said drive end including a drive assembly comprising a motor for moving said trolleys along said track circuit.

20. The system of claim 19, wherein said arcuate track section of said idle end includes a groove within which said trolleys are adapted to roll, and wherein said groove is aligned with said cavities of said straight track sections to enable said trolleys to transition between said straight track sections and said idle end, and wherein said arcuate track section of said drive end includes a groove within which said trolleys are adapted to roll, and wherein said groove is aligned with said cavities of said straight track sections to enable said trolleys to transition between said straight track sections and said drive end.

21. The system of claim 18, wherein said system comprises an additional said idle end that includes the other of said arcuate track sections, and wherein said drive system further includes a drive assembly including a toothed drive configured to engage said shafts of said trolleys to move said trolleys.

22. The system of claim 21, wherein said drive assembly is disposed at one of said straight track sections.

23. A system for growing plants, said system comprising:
an elevated track circuit configured to be supported by an overhead structure, said track circuit comprising two straight track sections and two arcuate track sections;
an idle end with said idle end including one of said arcuate track sections;
a drive end with said drive end including the other of said arcuate track sections;
a plurality of trolleys, wherein each said trolley includes a wheel configured to roll along said track circuit and a shaft extending downwardly form said wheel; and
a drive system at said drive end configured to move said trolleys along said track circuit with said trolleys connected together by a cable, said drive system comprising a drive assembly that includes a motor for moving said trolleys along said track circuit; and wherein said shafts of said trolleys are configured to support plants coupled thereto with said trolleys selectively moving the plants along said track circuit, and wherein said drive assembly further includes a pair of toothed drive sprockets connected together for simultaneous rotation and adapted to be driven by said motor, and wherein said trolleys each include a shaft extending downwardly from a wheel, and wherein said toothed drive sprockets are configured to engage said shafts of said trolleys to move said trolleys.

* * * * *